US012576887B2

(12) United States Patent
Zeng et al.

(10) Patent No.: US 12,576,887 B2
(45) Date of Patent: Mar. 17, 2026

(54) ROUTE LANE MATCHING BASED ON GRAPH SEARCH

(71) Applicant: Zoox, Inc., Foster City, CA (US)

(72) Inventors: Xiaosi Zeng, Redwood City, CA (US);
Lakshay Garg, Palo Alto, CA (US);
Cheng Peng, Sunnyvale, CA (US);
Andres Guillermo Morales Morales,
San Francisco, CA (US)

(73) Assignee: Zoox, Inc., Foster City, CA (US)

( * ) Notice: Subject to any disclaimer, the term of this
patent is extended or adjusted under 35
U.S.C. 154(b) by 363 days.

(21) Appl. No.: 18/217,132

(22) Filed: Jun. 30, 2023

(65) Prior Publication Data

US 2025/0002048 A1      Jan. 2, 2025

(51) Int. Cl.
B60W 60/00          (2020.01)
B60W 40/06          (2012.01)

(52) U.S. Cl.
CPC ........ B60W 60/0027 (2020.02); B60W 40/06
(2013.01); *B60W 2554/80* (2020.02)

(58) Field of Classification Search
None
See application file for complete search history.

(56) References Cited

U.S. PATENT DOCUMENTS

| | | | | |
|---|---|---|---|---|
| 10,403,172 | B2 * | 9/2019 | Matsumoto | .......... G09B 29/007 |
| 11,725,954 | B2 * | 8/2023 | Chan | .................... G05D 1/0285 |
| | | | | 701/421 |
| 12,163,791 | B2 * | 12/2024 | Liu | .................... G01C 21/3815 |
| 12,190,155 | B2 * | 1/2025 | Usikov | ................. G06F 9/5016 |
| 2016/0153787 | A1 * | 6/2016 | Dong | .................... G01C 21/26 |
| | | | | 701/533 |
| 2017/0120926 | A1 | 5/2017 | Yoon | |

FOREIGN PATENT DOCUMENTS

| | | |
|---|---|---|
| CN | 111383297 A | 7/2020 |
| CN | 115331448 A | 11/2022 |
| JP | H07191743 A | 7/1995 |
| KR | 20220145460 A | 10/2022 |

OTHER PUBLICATIONS

Search Report and Written Opinion for International Application
No. PCT/US24/34126, Dated Oct. 7, 2024, 9 pages.

* cited by examiner

*Primary Examiner* — James J Lee
*Assistant Examiner* — David Hatch
(74) *Attorney, Agent, or Firm* — Lee & Hayes, P.C.

(57)          ABSTRACT

Techniques for identifying road segments associated with an
object trajectory are discussed herein. A computing device
can implement a model that extracts points from an object
trajectory and identifies road segments along a path between
the extracted points. The model can determine a set of road
segments for the path based on searching a graph. The graph
can comprise nodes to represent different road segments, and
a graph search algorithm can output road segments repre-
senting a shortest path between the nodes associated with the
extracted points. The road segments can be used by a vehicle
computing device for predicting vehicle actions to control a
vehicle.

20 Claims, 5 Drawing Sheets

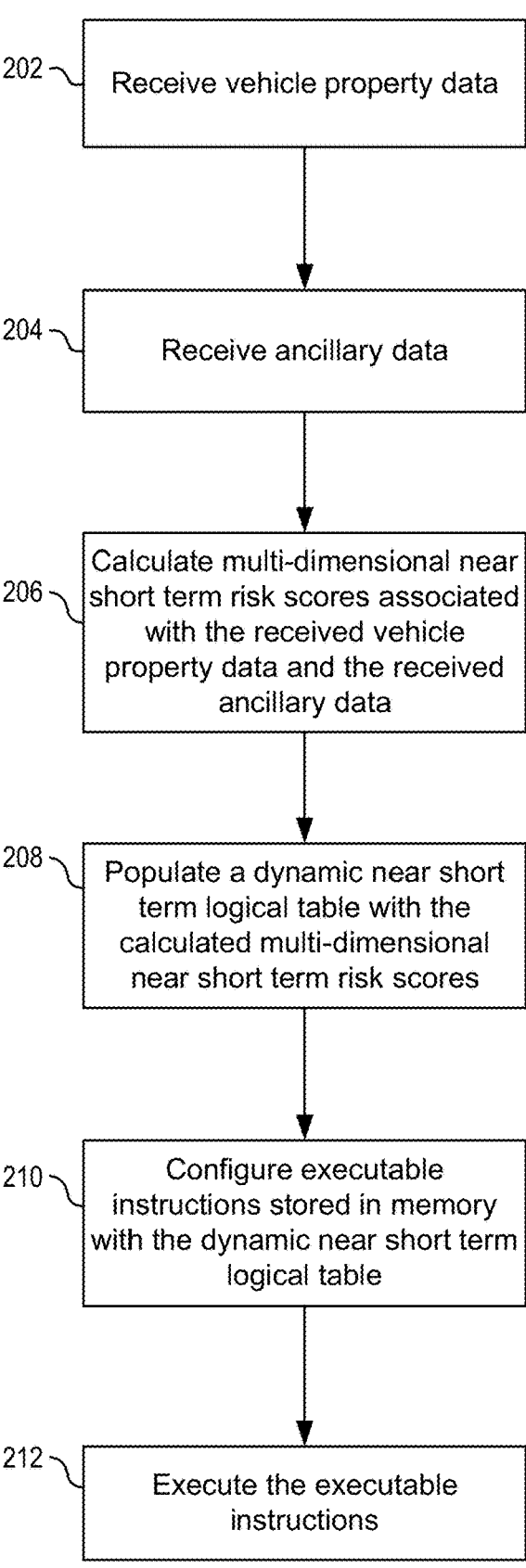

202 — Receive vehicle property data

204 — Receive ancillary data

206 — Calculate multi-dimensional near short term risk scores associated with the received vehicle property data and the received ancillary data 208 — Populate a dynamic near short term logical table with the calculated multi-dimensional near short term risk scores 210 — Configure executable instructions stored in memory with the dynamic near short term logical table 212 — Execute the executable instructions

FIG. 2

302   Receive vehicle property data

304   Receive ancillary data

306   Calculate multi-dimensional near short term risk scores associated with the received vehicle property data and the received ancillary data 308   Take close call detection actions and provide close call detection alerts

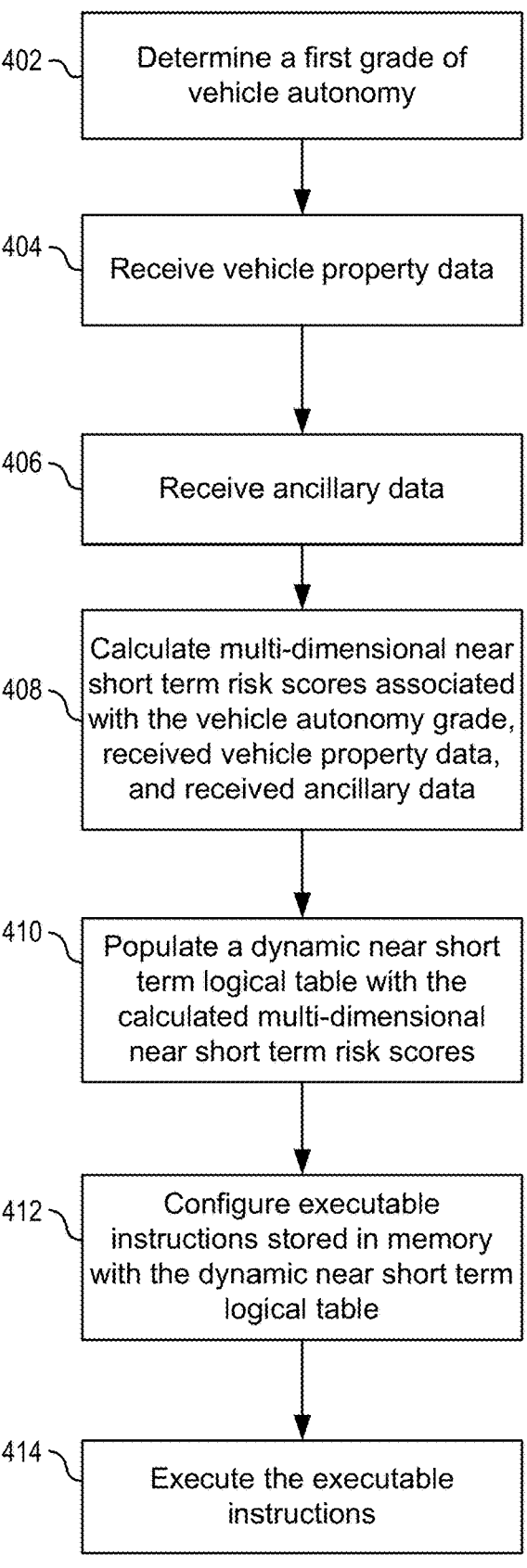

402 — Determine a first grade of vehicle autonomy

404 — Receive vehicle property data

406 — Receive ancillary data

408 — Calculate multi-dimensional near short term risk scores associated with the vehicle autonomy grade, received vehicle property data, and received ancillary data 410 — Populate a dynamic near short term logical table with the calculated multi-dimensional near short term risk scores 412 — Configure executable instructions stored in memory with the dynamic near short term logical table 414 — Execute the executable instructions

FIG. 4

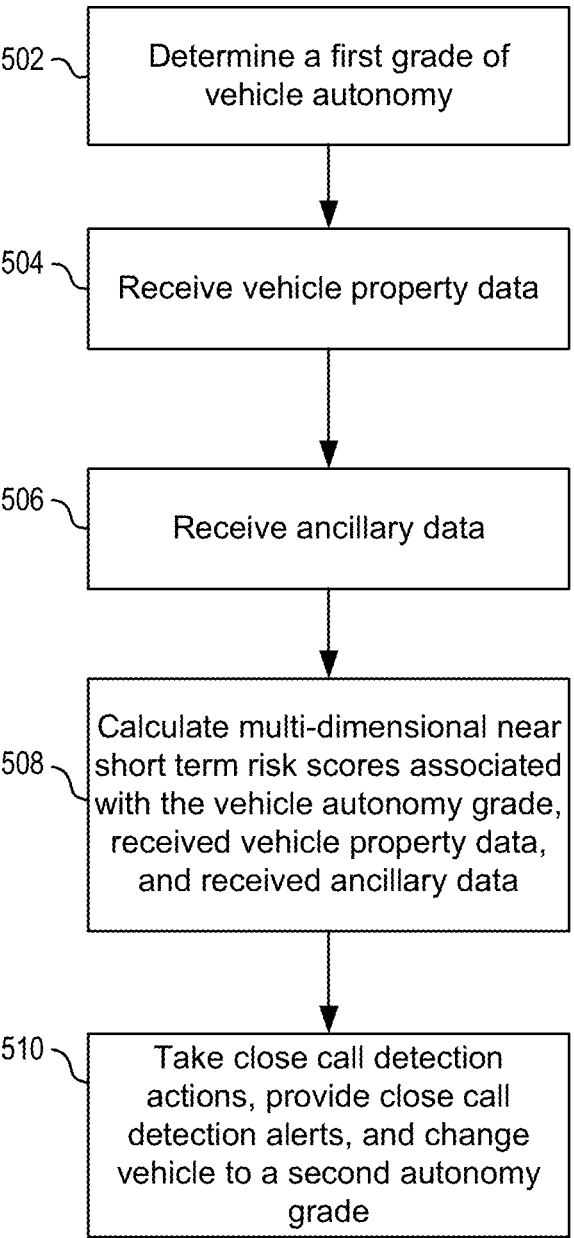

502 — Determine a first grade of vehicle autonomy

504 — Receive vehicle property data

506 — Receive ancillary data

508 — Calculate multi-dimensional near short term risk scores associated with the vehicle autonomy grade, received vehicle property data, and received ancillary data 510 — Take close call detection actions, provide close call detection alerts, and change vehicle to a second autonomy grade

FIG. 5

ROUTE LANE MATCHING BASED ON GRAPH SEARCH

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Accurately predicting future actions may be necessary to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is an illustration of another example environment, in which an example computing device determines a subset of road segments based on a trajectory associated with an object.

FIG. 4 is a block diagram of an example system for implementing the techniques described herein.

FIG. 5 is a flowchart depicting an example process for determining a subset of road segments using one or more example components.

DETAILED DESCRIPTION

Figure 1:
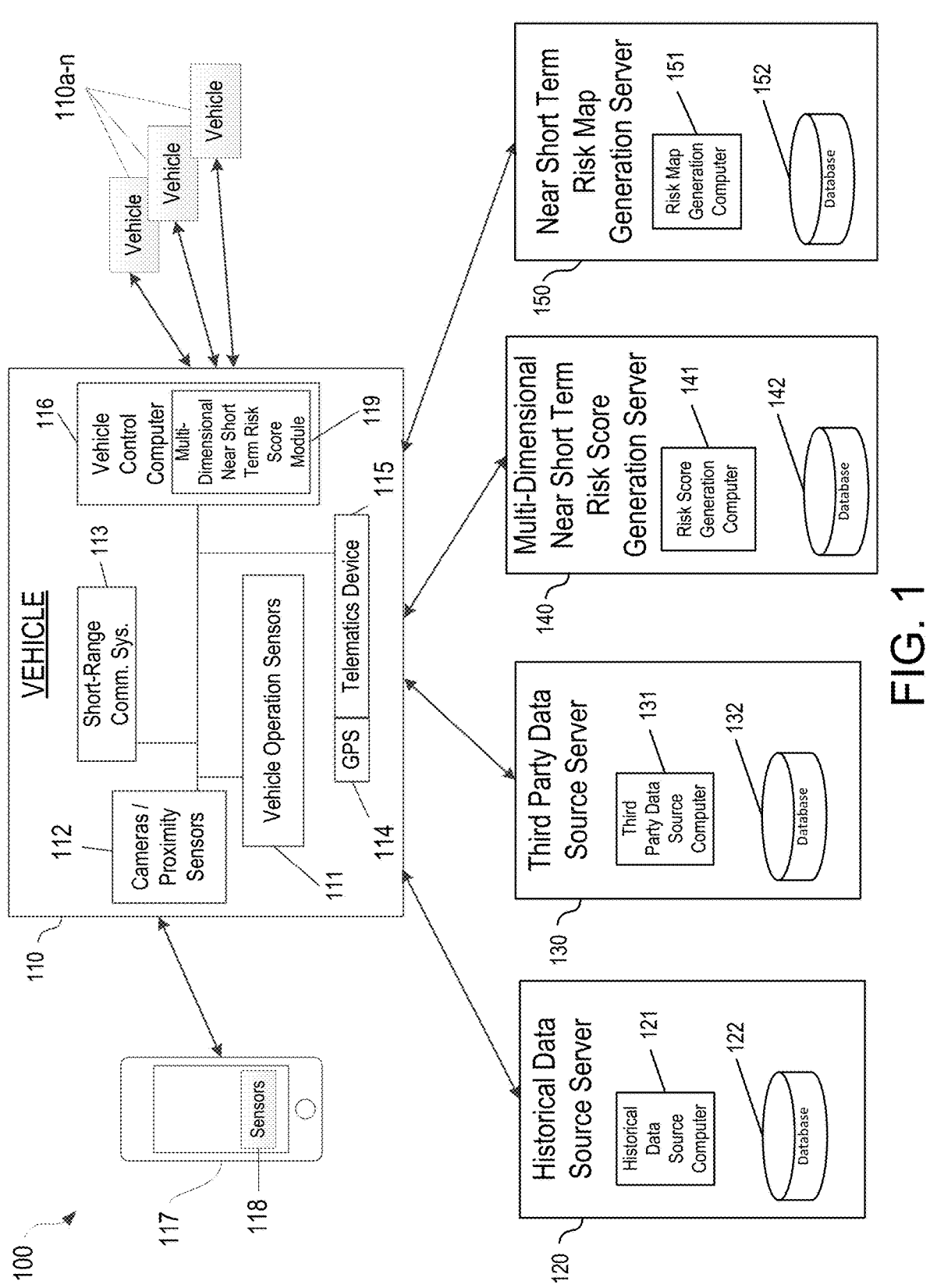
FIG. 1 is an illustration of an example environment, in which an example computing device determines a subset of road segments associated with an object trajectory.

Techniques for identifying road segments associated with an object trajectory are discussed herein. The techniques can include a computing device extracting points from an object trajectory and identifying road segments (e.g., unique portions of a roadway) along a path between the extracted points. The computing device can, for example, determine a set of road segments for the path based on searching a graph. The graph can comprise nodes to represent different road segments, and a graph search algorithm can output road segments representing a shortest path between the nodes associated with the extracted points. The computing device can send the set of road segments and the object trajectory to a vehicle computing device that determines interactions between a vehicle and one or more objects in an environment in the future. By implementing the techniques described herein, the vehicle computing device can predict vehicle actions to control the vehicle with more accuracy and in less time, thereby improving the overall safety of the vehicle. Further, the vehicle computing device can save computational resources to control a vehicle in an environment by receiving a set of road segments that represents a subset of candidate road segments associated with the object trajectory.

In various examples, the computing device can receive map data representing an environment (e.g., a real-world environment and/or a simulated environment) and identify road segments in the environment based on the map data. Generally, each road segment may represent different areas in an environment, and accordingly may have unique properties or attributes. By way of nonlimiting example, each road segment may have properties identifying one or more of geometry information (e.g., width, length, curvature, or other extents), roadway grade, a number of lanes, lane type(s), lane direction of travel, traffic rules (e.g., speed limit, right-of-way, etc.), traffic signs (e.g., lights, signs, etc.), road markings (lane markers, crosswalks, etc.), and the like. Thus, road segments can vary in size and shape, lanes, and/or other information. In some examples, a road segment can include a parking lane, crosswalk, no parking zone, median or other physical barrier, bridge, tunnel, sidewalk, speed bump, bicycle lane, or other properties.

The computing device can implement one or more components to perform road segment identification techniques as described herein. For example, a point generator can receive one or more object trajectories as input and output a start point and a finish point for a path that includes fewer points than the object trajectory(ies). In some examples, the point generator can determine a path that is based on the object trajectory but excludes one or more points defining the object trajectory.

The computing device can implement a mapping component to map, identify, or otherwise determine road segments associated with a path generated from the point generator. For instance, the mapping component can determine road segments that intersect with the path and/or that are within a threshold distance of the path. For example, the mapping component can identify a road segment that is adjacent to the path usable by an object associated with an object trajectory. In other words, the techniques described herein can include identifying road segments for consideration during planning operations that can include a road segment that is different from road segments associated with an object trajectory. Using the techniques described herein, a vehicle computing device that controls a vehicle in an environment can receive a set of road segments and perform a simulation with consideration to road segment properties that can effect an action by the object or a vehicle. In various examples, the set of road segments output by the mapping component can represent more diverse road segment information for consideration by a planning component than otherwise available without implementing the techniques.

The vehicle computing device can implement one or more components to perform planning operations as described herein. For example, a prediction component can determine one or more predicted trajectories associated with an object(s) in an environment. In some examples, a same or different computing device can receive the predicted trajectory(ies) to determine points defining a path. In various examples, a planning component can determine interactions between two or more objects and/or interactions between an object and the vehicle based on road segments associated with the defined path.

In various examples, a point can be associated with multiple road segments, and the computing device can select one of the multiple road segments to include in a set of road segments. For example, a road junction can include multiple road segments associated with a same point, and the computing device can compare properties of various road segments to characteristics of the object trajectory (e.g., yaw, length, etc.). The computing device can, for instance, compare a yaw of the object trajectory to a yaw associated with each candidate road segment, and select the road segment having a yaw closest to the yaw of the object trajectory.

In some examples, the computing device can receive object state data (e.g., position data, orientation data, heading data, velocity data, speed data, acceleration data, yaw rate data, or turning rate data associated with the object) and/or the vehicle state data (e.g., position data, orientation data, heading data, velocity data, speed data, acceleration data, yaw rate data, or turning rate data associated with the vehicle) from a perception component of a vehicle that uses one or more sensors to detect and predict objects surrounding an environment (e.g., a simulated environment and/or a real-world environment) of the vehicle. In various examples, the computing device can receive sensor data, map data, or other input data and identify road segments for further processing (e.g., by a planning component).

In various examples, the map data can represent static features of the environment (which, in at least some examples, may also comprise designations for lane markings, lane speed, road control information—e.g., stop signs, traffic signals, crosswalks, school zones, speed bumps, and the like). The map data can be received from one or more components of a vehicle computing device or remote computing device (e.g., a computing device associated with an autonomous vehicle in a fleet of vehicles or other computing device remote from the vehicle). In some examples, the point generator can receive the map data, and determine candidate road segments in an environment based at least in part on the map data. The mapping component can select from among the candidate road segments (or otherwise determine to use one or more particular road segments) to output a set of road segments for consideration during planning operations.

In some examples, the set of road segments output by the computing device can be used to test vehicle performance in an environment. For instance, simulations can be performed in which one or more vehicle trajectories are associated with one or more road segments in the set of road segments, and a result of the simulations can be used to improve vehicle performance and/or passenger safety (e.g., improve predictions and/or determinations by the vehicle computing device). For example, during a simulation a vehicle controller or vehicle computing device can determine potential actions of the vehicle relative to the set of road segments, as described herein. In some examples, a result of the simulation (e.g., a metric indicative of performance by the vehicle) can be determined, and the vehicle can be controlled in a real-world environment and/or a simulated environment based at least in part on the result. Additional details for determining and using a set of road segments are described herein, including in relation to FIGS. 2 and 3.

In some examples, a component or model may define processing resources (e.g., processor amount, processor cycles, processor cores, processor location, processor type, and the like) to use to predict points associated with an object trajectory, perform a graph search, and so on. A computing device can implement a model that may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may generate a set of road segments by processing data associated with the object and/or the vehicle using a GPU, CPU, or a combination thereof. In this way, the model may be defined to utilize the processing resources that enable the model to perform predictions in the least amount of time (e.g., to use the set of road segments in planning considerations of the vehicle). Accordingly, a model may make the best use of available processing resources and enable more predictions that may improve how a vehicle navigates in relation to the objects.

Aspects of the processing operations may be parallelized and input to a parallel processor unit (such as a GPU) for efficient processing. Accordingly, implementing the techniques described herein can efficiently make use of available computational resources (e.g., memory and/or processor allocation or usage) while also improving accuracy of predictions. For example, the point generator can determine at least some of the points, perform multiple graph searches, etc. in parallel by one or more GPUs.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the computing device can implement a model or component to identify which road segments to process in an environment to prevent processing related road segments. The set of road segments can be used by the vehicle computing device to improve predictions related to the behavior of the vehicle. In some examples, the model improves functioning and safety of the vehicle by preventing the vehicle from taking additional actions that are not required based on conditions in the environment around the vehicle, thereby, for example, allowing additional computational resources to be allocated to executing the model. In addition, the techniques described herein can improve passenger comfort and/or vehicle safety such as, for example, avoiding sudden braking or swerving when not needed (e.g., identifying the vehicle action based on properties associated with one or more road segments). The techniques can include the model optimizing available computational resources by performing operations that limit the impact on the available resources (as compared to not implementing the model). Utilizing output data from the model by a vehicle computing device, for instance, can improve the accuracy and/or reduce a latency for the vehicle to respond to a potential collision in the environment.

In various examples, implementing the model can improve safety of a vehicle by outputting a subset of road segments for consideration during planning operations. For example, a reduced set of road segments determined for the vehicle can be based at least in part on comparing respective properties of different road segments. By implementing the model, consideration to a current set of road segments representing the reduced set usable for determining potential actions by each object and/or potential actions by the vehicle over time in a simulation, can be determined in substantially real-time before a safest possible route is determined for the vehicle to follow.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100, in which an example computing device determines a subset of road segments associated with an object trajectory. For instance, one or more computing devices (shown as computing device 102 in FIG. 1) includes example models, point generator 104 and mapping component 106. The computing device 102 is configured to receive input data 108 and determine output data 110. In some examples, a vehicle computing device (e.g., vehicle computing device(s) 404) and/or a remote computing device (e.g., computing device(s) 436) may implement model(s). While described as a separate system, in some examples, road segment identification techniques described herein may be implemented by other vehicle systems, components, and/or computing devices. For example, and as will be described in further detail with regard to FIG. 4, the road segment identification techniques described herein may be implemented at least partially by or in association with a localization component 420, a perception component 422, a prediction component 424, and/or a planning component 426.

As shown in FIG. 1, the environment 100 includes a vehicle 112 (e.g., an autonomous vehicle), though in some examples, the techniques can be performed independent of the vehicle 112. In some examples, a position or trajectory of the vehicle 112 may be used to identify road segments that the vehicle 112 may occupy at some point in the future. However, in other examples the point generator 104 can identify road segments independent of the vehicle 112 being in the environment and/or data associated with the vehicle 112 being used as input.

The environment 100 includes a road segment 114(1), a road segment 114(2), a road segment 114(3), a road segment 114(4), and a road segment 114(5) (collectively the road segments 114). In some examples, a different number of road segments may be associated with the example environment 100. Road segments can vary in area (e.g., geometry, etc.) and a single location in the environment can be associated with multiple road segments.

In various examples, the computing device 102 may be configured to receive sensor data representing object(s) of the environment 100, such as via a perception component (e.g., the perception component 422). In some examples, the vehicle computing device may detect, infer, estimate, or otherwise determine object state data representing characteristics of the object in the environment 100. For example, such object state data may comprise position, velocity, acceleration, size, semantic type, etc. In some examples, the sensor(s) may include sensors mounted on the vehicle 112, and may include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example, sensors mounted on another autonomous vehicle, and/or sensors mounted in the environment 100. In various examples, the vehicle 112 may be configured to transmit and/or receive data from other autonomous vehicles. The data may include sensor data and/or state data, such as sensor data associated with the environment 100.

In some examples, the computing device 102 may be configured to detect an object in the environment 100, such as object 116 (e.g., a vehicle), though other objects may also be detected. In some examples, the computing device 102 may be configured to receive, detect, infer, estimate, or otherwise determine one or more trajectories (e.g., orientation, speed, acceleration, etc.) for the vehicle 112 and each detected object. As shown in FIG. 1, the object 116 is associated with an object trajectory 118 (also referred to as the trajectory 118) determined by the computing device 102 (e.g., using the perception component 422, the prediction component 424, or another model). In some examples, the computing device 102 may receive path information associated with the object trajectory 118 from a machine learned model. Though FIG. 1 shows a single trajectory associated with the object 116, any number of objects may be detected and any number of object trajectories may be predicted for each object.

In some examples, the vehicle 112 may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the computing device 102 to associated with the object and/or one or more tracking trajectories.

In some examples, the point generator 104 can receive the input data 108 comprising map data, object state data, and/or one or more object trajectories, though other input data may also be considered. For instance, the point generator 104 can receive the input data 108 representing the trajectory 118 (e.g., as may be determined based on a prediction associated with the object). and determine a point 120 (e.g., a first point) and a point 122 (e.g., a last point). The point generator 104 can also or instead receive the road segment 114 from another component, a storage device, or other source.

Generally, the point generator 104 can represent functionality to generate points based at least in part on the input data 108. For instance, the point generator 104 can extract points associated with the trajectory 118 to define a path 124 made up from two or more points (e.g., the point 120 and the point 122). The point 122 can represent an intent of the object 116 which the point generator 104 can use to predict whether the object 116 can travel in an oncoming lane to avoid a double parked car (ignore traffic rules). In other words, given the endpoint (e.g., the point 122) is provided, the path 124 can be constructed using any road segment including a road segment adjacent to the path 124.

To determine the path 124, the point generator 104 can identify a closest road segment in which the point 120 is located in the environment 100 and a furthest point along the predicted trajectory for the object (e.g., last point 122). The point generator 104 can perform a search of a graph (e.g., from the first point 120 to the last point 122) defined with nodes corresponding to road segments, and edges representing connections between respective nodes or road segments. In various examples, the point generator 104 can identify a location of the point 120 and/or a location of the point 122 to determine a road segment associated with the respective point. In some examples, and as explained further in FIGS. 2 and 3, a point can be associated with multiple road segments, such as when the point is located in a junction. In examples when a point is associated with multiple road segments, the computing device 102 can select one of the multiple road segments to include in a set of road segments. For example, the computing device 102 can compare properties of various road segments to characteristics of the object trajectory (e.g., yaw, length, etc.). The computing device 102 can, for instance, compare a yaw of the object trajectory to a yaw associated with each candidate road segment, and select the road segment having a yaw closest to the yaw of the object trajectory 118.

In some examples, the mapping component 106 can generate the output data 110 comprising road segments associated with the path 124. For instance, the mapping component 106 can identify one or more road segments that intersect and/or are adjacent to the path 124. For instance, a road segment may or may not overlap or intersect a road segment for the mapping component 106 to select the road segment (e.g., a candidate road segment) as a set of road segments. As illustrated, the path 124 may be associated with the road segment 114(1), the road segment 114(3), the road segment 114(1), and the road segment 114(5). In some examples, the mapping component 106 can select the road segment 114(5) despite traffic rules for the road segment indicating that the object 116 would travel against the direction of travel based on traffic rules associated with the road segment 114(5). By including the road segment 114(5) in the output data 110, the vehicle 112 can consider that the object 116 can potentially travel in a lane against the direction of travel during planning operations.

In some examples, the point generator 104 can determine a midpoint of the path 124, or some other point in addition to the point 120 and the point 122. For instance, the point generator 104 can determine points that further define the path 124 including identifying a threshold number of points for a particular trajectory (e.g., as a function of trajectory length, velocity, etc.). The point generator 104 can add points up to the threshold number of points to prevent adding too many points and bypassing any computational resources savings benefits. For instance, three of four points for a path may provide a more detailed path while also being less detailed than the object trajectory (e.g., have fewer points) which saves computational resources versus later identifying all road segments associated with the object trajectory.

In some examples, the point generator 104 can add a point to the path 124 based at least in part on a length of the path (e.g., compared to some length threshold). For instance, based on a path having a length over a threshold value, the point generator 104 can add points to cause fewer potential paths to be identified between the points.

In various examples, the point generator 104 can receive map data representing static features of the environment 100 (e.g., lane markings, lane speed, roadway traffic control information—e.g., stop signs, traffic signals, crosswalks, school zones, speed bumps, and the like). In some examples, the map data can be received from one or more components of the vehicle computing device and/or the remote computing device.

In some examples, the map data can represent top-down multi-channel data indicative of a top-down representation of an environment (e.g., wherein each channel or layer comprises data about the scene). In some examples, such channels may represent, for example, occupancy, speed, lane indications, speed limits, traffic control, object type, etc. The top-down representation can include a channel(s) to represent one or more of: an attribute (e.g., position, class, velocity, acceleration, yaw, turn signal status, etc.) of an object, history of the object (e.g., location history, velocity history, etc.), an attribute of the vehicle 112 (e.g., velocity, position, etc.), crosswalk permission, traffic light permission, a road segment, and the like. Thus, the map data can include one or more channels to convey various contexts of a real-world scene and/or a simulated scene.

In some examples, the map data describing the environment 100 can be represented by a graph, a vector representation, or other representation other than the top-down representation of the environment. For instance, the point generator 104 can receive, additionally or alternatively, a vector representation of the road segments, environment, vehicle, object(s), etc. In some examples, the vector representation can be determined by a Graph Neural Network which is a type of neural network that operates on a graph structure. Machine-learning based inference operations may be performed to update the state of the graph neural network, including updating nodes and/or edge features, based on internal inputs determined from the graph neural network itself and/or based on updated observations perceived by the autonomous vehicle in the environment. The vector can represent a feature of the environment 100 including but not limited to a vehicle, an object, a roadway, a trajectory over time, and so on.

The point generator 104 can receive the input data 108 (e.g., map information and/or road segment information from a database properties of multiple road segments associated with an environment, etc.) from a storage device comprising property data for each of the road segments 114. Road segments received as input can also be thought of candidate roads segments usable for the point generator 104 to determine a set of road segments that excludes one or more candidate road segments thereby reducing a number of road segments associated with the output data 110.

As illustrated, the road segments 114 can represent different areas of the environment 100 (e.g., a real-world environment or a simulated environment) and can include different properties. The road segment information can include properties identifying one or more of geometry information (e.g., width, length, curvature, orientation, or other extents), roadway grade, a number of lanes, lane type(s), lane direction of travel, traffic rules (e.g., speed limit, right-of-way, etc.), traffic signs (e.g., lights, signs, etc.), road markings (lane markers, stop line, yield line, crosswalk, etc.), just to name a few.

In some examples, a portion of a road segment can include a parking lane, a crosswalk 126, a sidewalk, traffic information, or other properties. For instance, the road segment 114(4) and/or the road segment 114(5) can include one or more crosswalks based on having an area that defines or covers a junction in the environment 100. In various examples, properties of a road segment may comprise one or more of: a length, a width, a curvature, an average curvature, yaw data, a speed limit, a maximum speed between junctions, a number of lanes, a parking space, a bicycle lane, a driveway, a signaled junction, a non-signaled junction, a public roadway, a private roadway, a roadway marking (e.g., double, single, and/or dashed lines in yellow, white, blue, or another color), a centerline, a roadway boundary, a curb, a crosswalk, a slope, a number of junctions, traffic control sign, traffic control light, a chicken lane, a yield line, a geographical location, and the like.

By way of example and not limitation, the point generator 104 can receive multiple object trajectories associated with one or more objects and define one or more graphs having nodes corresponding to road segments in an environment. The mapping component 106 can, for instance, access, define, or otherwise determine graphs having nodes that correspond to road segments received as part of the input data 108. The mapping component 106 can search the graph(s) by applying a graph search algorithm to search nodes of the graph corresponding to a path having points that are based on the multiple object trajectories. In such examples, a "dummy" node/point may be inserted prior to any other node/point such that the graph search considers all nodes of the multiple object trajectories during the search. Additionally, or alternatively, a heuristic (such as a heading of the vehicle) may be used to downselect the number of trajectories to explore (e.g., as input data). In some such examples, heuristics may disregard trajectories associated with headings that are infeasible or otherwise unlikely (i.e., a difference in heading between the road segment and the object at a point). Regardless, multiple graph searches may be performed (in parallel, in at least some examples) and a score may be associated with an output of each graph search. A highest score may be determined to identify the most likely set of road segments the object will traverse.

In some examples, the point generator 104 can identify the candidate road segments based at least in part on the map data. For instance, road segments and properties thereof may be included as part of the map data, and the point generator 104 can determine the candidate road segments by analyzing the map data received from a database that maintains map information for multiple environments (e.g., cities, geofences, or the like).

In various examples, the output data 110 from the point generator 104 can represent a set of road segments with a reduced number of road segments relative to a number of road segments received as the input data 108. However, the set of road segments can still represent the environment 100 within a threshold amount of accuracy which enables the set of road segments to be processed in the future rather than processing all of the candidate road segments.

The output data 110 from the point generator 104 can be used by a computing device in a variety of ways. For instance, the point generator 104 can generate a signal indicating information about the output data 110 (e.g., the set of road segments) for transmitting to a planning component (e.g., planning component 426) of the vehicle computing device to control the vehicle 112 in the environment 100 (e.g., determine a vehicle trajectory and/or control a propulsion system, a braking system, or a steering system).

In various examples, the output data 110 can be sent to a simulation component (not shown) to initiate a simulation between the vehicle 112 and one or more objects in the environment 100 using the set of road segments. For example, the simulation may include processing road segment data associated with the set of road segments including road segment properties when determining the vehicle action for the vehicle 112. In some examples, a result of the simulation can indicate vehicle performance which may further be evaluated to improve vehicle actions in the future. The output data 110 can, for example, be used to validate or test vehicle performance of the vehicle 112 in a simulated environment and/or a real-world environment.

The computing device 102 can store the output data 110 (e.g., the reduced set of road segments) in a storage device (e.g., memory, database, etc.) in a file format for access by one or more components of the computing device and/or by the vehicle computing device. A prediction component of the vehicle computing device may, for example, access the output data 110 to improve predictions based on sensor data associated with the vehicle 112.

In some examples, the vehicle computing device may control the vehicle 112 in the environment based at least in part on the output data 110 (e.g., determine a candidate trajectory to avoid the objects in the environment). For instance, the vehicle computing device may provide functionality to identify objects most likely to cause an intersection and communicate intersection information about the identified objects to other components of the vehicle computing device. Accordingly, potential intersections (e.g., a probability or likelihood of an intersection between object(s) and the vehicle) and/or the tracking trajectories may be taken into account in operations (e.g., simulations, estimated states, interaction modeling, collision estimation, etc.) or other vehicle control planning operation (e.g., as determined by a planning component) to quickly and/or preemptively avoid objects, thereby improving safety of the vehicle. Additional detail for determining and utilizing the output data 110 are discussed throughout this disclosure. Additional details of performing simulations and/or generating trajectories are described in U.S. patent application Ser. No. 15/632,147, filed on Jun. 23, 2017, entitled "Trajectory Generation Using Temporal Logic and Tree Search," and U.S. patent application Ser. No. 15/843,512, filed on Dec. 15, 2017, entitled "Trajectory Generation Using Curvature Segments," which are incorporated herein by reference in their entirety and for all purposes.

FIG. 2 is an illustration of another example environment 200, in which an example computing device determines a subset of road segments based on a trajectory associated with an object. For instance, the computing device 102 of FIG. 1 can implement the point generator 104 and/or the mapping component 106 to determine the output data 110 representing a set of road segments associated with an object trajectory.

FIG. 2 shows the mapping component 106 comprising an analysis component 202. In various examples, the analysis component 202 can include functionality to analyze multiple available paths and select at least one of the paths for associating with road segments. The analysis component 202 may also or instead determine a score for a road segment to represent a similarity among properties of the road segment and features of an object trajectory. For example, scores for a road segment, or set of road segments, can be used to determine whether or not to include a respective road segment in the output data 110 (e.g., a road segment having a highest score relative to another road segment score and/or comparing a score to a threshold).

In some examples, the analysis component 202 can determine scores for sets of nodes usable for selecting one of the set of nodes to define a path. In examples when multiple paths are available between two points (e.g., a first point and a last point), the analysis component 202 can assign a first score to a first set of nodes defining a first path and a second score to a second set of nodes defining a second path. The analysis component 202 can determine a score for a set of nodes based at least in part on properties of one or more road segments associated with each node in the set of nodes. In some examples, the score can be based on properties for a road segment at a particular node and/or properties of the road segments making up a respective path. By way of example and not limitation, the analysis component 202 can receive two or more candidate sets of nodes (e.g., representing candidate paths) and a trajectory (e.g., an object trajectory) as input and determine scores for each candidate set of nodes. The analysis component 202 can select the candidate set of nodes (e.g., candidate path) having a highest score (e.g., properties most similar to those of the trajectory). In this way, the analysis component 202 can select a path from among two or more possible paths from which to determine a set of road segments as output.

In various examples, the computing device 102 can allocate or assign data in memory including determining a location or portion of the memory for efficient processing of the input data 108. In this way, a processor (e.g., one or more GPUs) of the computing device 102 can efficiently process the input data 108 during generation of the output data 110. In some examples, the computing device 102 can allocate the input data 108 to a parallel processor unit (e.g., a CPU, GPU, or the like capable of processing input data at substantially a same time).

As illustrated in FIG. 2, the point generator 104 can determine a point 204 (e.g., an first point) and a point 206 (e.g., a last point) associated with the trajectory 118. The point generator can further determine a path 208 (e.g., a first path) and a path 210 (e.g., a second path) associated with the point 204 and the point 206. For example, the point generator 104 can determine two different paths for the object 116 to reach the point 206 at a future time. The mapping component 106 can implement the analysis component 202 to select the path 208 or the path 210 to associate with road segments. For example, the point generator 104 can generate an additional point (e.g., an midpoint or other point) along the path 208 and another additional point along the path 210. The analysis component 202 can identify which one of the path 208 or the path 210 has a midpoint closest to the trajectory 118.

The mapping component 106 can receive an indication from the analysis component 202 to identify road segments for the path 208 and/or the path 210. For instance, the analysis component 202 can determine the path 208 includes a midpoint closer to a midpoint of the trajectory to 118 than a midpoint of the path 210, and send an indication to further process the path 208. The mapping component 106 can, for example, associate the path 208 with the road segment 212(1), the road segment 212(2), the road segment 212(3), and the road segment 212(4). Thus, the analysis component 202 select from various paths for mapping road segments.

In some examples, the analysis component 202 can identify the path 208 and/or the path 210 for further processing based at least in part on comparing characteristics of the path 208 with characteristics of the path 210. For example, a length of the path 208 and/or the path 210 may be used for selecting identifying which path further process. In some examples, the point generator 104 can generate another point for a path based at least in part on determining that the length of the path meets or exceeds a length threshold.

In various examples, the analysis component 202 can identify the path 208 and/or the path 210 for further processing based at least in part on a graph search. For example, the analysis component 202 can determine one of the path 208 or the path 210 as an output of the graph search whether while performing the graph search (e.g., selecting the path having a shortest length, or edge between nodes) or as a final output of the graph search. In some examples, the mapping component 106 can determine a first set of road segments associated with the path 208 and a second set of road segments associated with the path 210. In such examples, the analysis component 202 can compare properties of respective road segments in the first set and the second set with features of the trajectory 118. For example, the analysis component 202 can compare yaw of a road segment in a particular set of road segments with a yaw associated with the trajectory 118. Additionally, or alternatively, the analysis component 202 can compare yaw of midpoint along the path 208 with yaw of a midpoint along the trajectory 118. Regardless of the properties compared, the analysis component 202 can identify the path 208 or the path 210 for determining a set of road segments.

In examples when the computing device 102 receives multiple object trajectories as input data, the point generator 104 can identify multiple start points and/or multiple endpoints for each object trajectory. In some examples, the point generator 104 can generate a point to represent multiple points (e.g., start points, end points, etc.) associated with the multiple object trajectories for more efficient processing. For example, the point generator 104 can define a node, point, or other value to represent a set of points so that a single point rather than the set of points are processed. The point generator 104 can, for example, generate a first node and/or an last node to represent a start for each of the object trajectories. By defining a value to represent the set of values as described herein, the computing device 102 can reduce a number of graphs searches required to determine the set of road segments.

Figure 3:
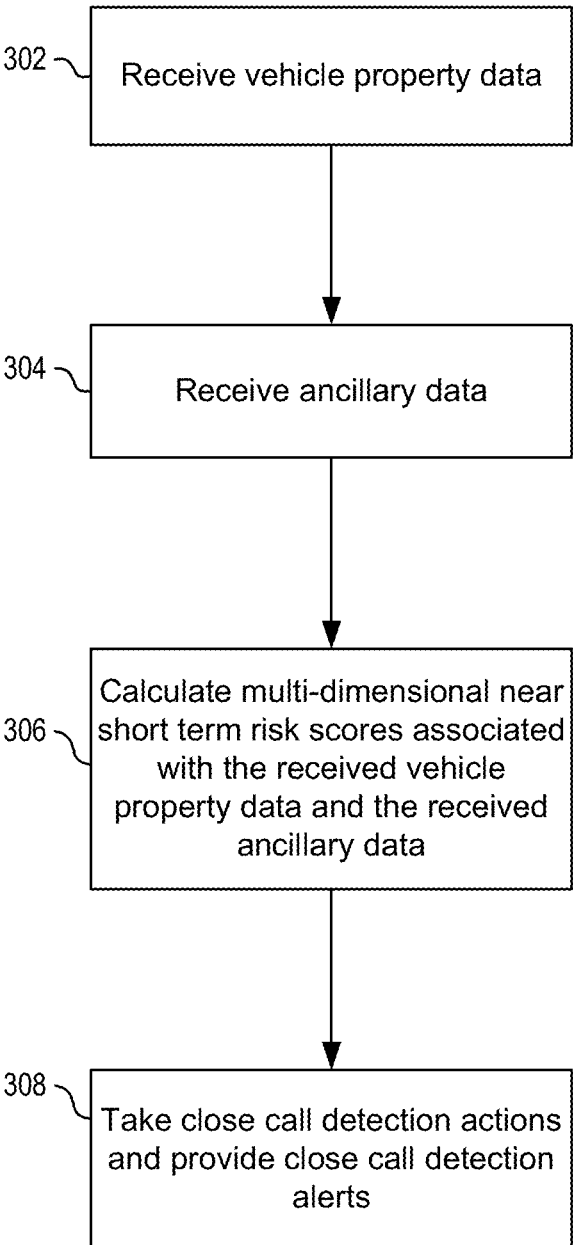
FIG. 3 is a block diagram of an example computing device selecting from multiple road segments associated with a point of an object trajectory.

In some examples, a graph search can determine road segments associated with the path 208 and/or the path 210, as further described in FIG. 3 and elsewhere. In various examples, the graph search can identify which road segments intersect, overlap, and/or are within a threshold distance of a receptive path. As a non-limiting example, nodes corresponding to road segments can be explored by a graph search algorithm which identifies a road segment for one or more points along the path. Nodes may be explored having the lowest cost and/or in which there is no adverse event (e.g., collision, uncomfortable control, etc.).

FIG. 3 is a block diagram 300 of an example computing device selecting from multiple road segments associated with a point of an object trajectory. For instance, the computing device 102 of FIG. 1 can implement the point generator 104 and/or the mapping component 106 to determine the output data 110 representing a set of road segments associated with an object trajectory.

In various examples, the computing device 102 can implement the point generator 104 to determine a point 302 in an environment, such as a point extracted from an object trajectory. The point 302 can represent a geographical location at which a single lane widens into two lanes, and as shown is associated with road segment 304 and road segment 306. FIG. 3 also shows an example in which the point generator 104 determines a point 308 associated with a road segment 310, a road segment 312, and a road segment 314. In some examples, the point 302 and/or the point 308 can represent a start point, an endpoint, or other point associated with a path, an object trajectory, a vehicle trajectory, or the like.

By way of example and not limitation, the mapping component 106 and/or the analysis component 202 can determine that the point 302 and/or the point 308 is associated with the path 124, the path 208, and/or the path 210, and can further determine which road segments to include as output representing a set of road segments usable by a vehicle computing device. For example, the mapping component 106 can determine whether to include the road segment 304 and/or the road segment 306 in the output data 110 based at least in part on a comparing yaw data (or other data describing a property of a road segment) associated with the road segment 304 and the road segment 306 with yaw information included as part of the input data 108 (e.g., as indicated by an object trajectory). In some examples, yaw data associated with the road segment 304 may be sufficiently similar to yaw data associated with the road segment 306, and a graph search can be performed using both road segments as nodes in a graph search.

In some examples, the mapping component 106 can identify a yaw for different road segments associated with the point 308, and compare the yaw values to a yaw of the trajectory 118. Based on the comparing, the mapping component 106 can select the road segment 310, the road segment 312, or the road segment 314 for inclusion in the set of road segments based on which road segment has a yaw closest to the yaw of the trajectory 118.

In some examples, the mapping component 106 can identify another point, such as an endpoint connected to the point 308, and use the other point to select, determine, or otherwise associate one of the road segment 310, the road segment 312, or the road segment 314 with a path. In other words, and as discussed herein, multiple candidate road segments can be reduced based at least in part on which road segments are connectable with other road segments to form a path between the point 308 and another point(s). In some examples, an endpoint can be used to determine a road segment, such as when another point indicates that the object is likely to turn right and only the road segment 312 "connects" the point 308 to the other point.

While described as a separate system, in some examples, techniques to determine road segments described herein in relation to FIGS. 1-3 may be implemented by other vehicle systems, components, and/or computing devices. For example, and as will be described in further detail with regard to FIG. 4, the prediction techniques described herein in relation to FIGS. 1-3 may be implemented at least partially by or in association with a perception component, a planning component, and/or a model component of FIG. 4.

FIG. 4 is a block diagram of an example system 400 for implementing the techniques described herein. In at least one example, the system 400 may include a vehicle, such as vehicle 402.

The vehicle 402 may include a vehicle computing device 404, one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states.

In the illustrated example, the memory 418 of the vehicle computing device 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the point generator 104 and/or the mapping component 106 as described in FIGS. 1-3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include a model component 432. The model component 432 may be configured to perform the functionality of the point generator 104 and/or the mapping component 106, including generating a set of road segments, such as the output data 110. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine whether an object intersects at an intersection point based at least in part on the one or more actions for the vehicle 402. In some examples, the model component 432 may be configured to determine the actions that are applicable to the environment, such as based on environment characteristics, weather characteristics, or the like.

The model component 432 may generate sets of estimated states of the vehicle and one or more detected objects forward in the environment over a time period. The model component 432 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or prediction. In some examples, the model component 432 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 432 may generate estimated states at 0.1 second intervals throughout the time period. For another example, the model component 432 may generate estimated states at 0.05 second intervals. The estimated states may be used by the planning component 426 in determining an action for the vehicle 402 to take in an environment.

In various examples, the model component 432 may utilize machine learned techniques to predict risks associated with evaluated trajectories. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine an object velocity or acceleration usable to predict potential intersection(s) between objects and/or between the vehicle 402 and one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the model component 432 (e.g., the model(s) 434). In some examples, the sensor data processing component 448 may be configured to send raw sensor data to the vehicle computing device 404.

In some instances, the training component 450 can include functionality to train a machine learning model to output evaluate trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can include functionality to train a machine learning model to output classification values. For example, the training component 450 can receive data that represents labelled collision data (e.g. publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of nontransitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

FIG. 5 is a flowchart depicting an example process 500 for determining a subset of road segments using one or more example components. For example, some or all of the process 500 can be performed by one or more components in FIG. 4, as described herein. For example, some or all of the process 500 can be performed by the vehicle computing device 404 or the computing device 102.

At operation 502, the process may include receiving a trajectory associated with an object in an environment. In some examples, the operation 502 may include a vehicle computing device capturing sensor data from a lidar sensor, a radar sensor, and so on, of the vehicle 402. The sensor data may be received from one or more sensors on the vehicle and/or from one or more remote sensors. In some examples, one or more trajectories can be predicted by a vehicle computing device (e.g., the prediction component 424) for the vehicle 402 and each detected object in an environment surrounding the vehicle. For instance, the object trajectory 118 may be determined by the prediction component 424, though additional trajectories may also be determined.

At operation 504, the process may include determining a first point and a second point associated with the trajectory. In some examples, the operation 504 may include a vehicle computing device implementing the point generator 104 (or different model) that is configured to extract, infer, estimate, or otherwise determine points defining a path that is based on the object trajectory(ies) received as input. In various examples, the point generator 104 can generate the point 120 and the point 122 defining the path 124. However, in other examples additional points can be determined including a midpoint between the first and second points.

At operation 506, the process may include searching a graph comprising a first node corresponding to the first point and a second node corresponding to the second point. In some examples, the operation 506 may include the mapping component 106 applying a search algorithm to a graph comprising nodes corresponding to each road segment and edges connecting respective nodes. For example, the mapping component 106 can determine a position of the point 120 and identify a road segment for the given position. In examples when the point is associated with multiple road segments, the mapping component 106 can disambiguate or otherwise determine which road segment to include as output based on the graph search.

At operation 508, the process may include determining, based at least in part on searching the graph, a set of road segments in the environment representing a path between the first point and the second point. In some examples, the operation 508 may include the mapping component 106 determining the output data 110. For example, the mapping component 106 can map road segments to the path 124.

At operation 510, the process may include sending the set of road segments to a vehicle computing device associated with a vehicle. In some examples, the operation 510 may include the mapping component 106 transmitting the set of road segments and one or more object trajectories received as input to one or more components of the vehicle computing device.

At operation 512, the process may include controlling the vehicle in the environment based at least in part on the set of road segments. For instance, the vehicle computing device can generate a vehicle trajectory for the vehicle to follow in the environment at a future time. In some examples, the operation 512 may include the planning component 426 utilizing information associated with the mapping component 106 to determine a candidate trajectory or other action for the vehicle to avoid the potential intersections between the objects and the vehicle. In some examples, the operation 512 may include controlling, by the vehicle computing device 404, the vehicle in an environment in the future based at least on the information from the point generator 104 and/or the mapping component 106.

In various examples, process 500 may return to 502 after performing operation 512. In such examples, the vehicle may continuously monitor for potential collisions and update/modify decisions regarding whether to engage a safety system or not (which may, in at least some examples, include performing one or more maneuvers to mitigate or minimize an impact). In any of the examples described herein, the process may repeat with a given frequency and generate one or more occupancy grids associated with one or more multiple times in the future for making the determinations above.

FIG. 5 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes. For instance, the example process may omit operation 512 and instead verify operation of a vehicle controller.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a trajectory associated with an object in an environment; determining a first point at a first end of the trajectory and a second point at a second end of the trajectory; searching a graph comprising a first node corresponding to the first point and a second node corresponding to the second point; determining, based at least in part on searching the graph, a set of road segments in the environment representing a path between the first point and the second point; sending the set of road segments and the trajectory to a vehicle computing device associated with an autonomous vehicle; and controlling the autonomous vehicle in the environment based at least in part on the set of road segments and the trajectory.

B: The system of paragraph A, the operations further comprising: determining a third point of the trajectory between the first point and the second point; and defining the third point as a third node in the graph, wherein searching the graph comprises: determining a path that includes the first point, the second point, and the third point, and determining, as the set of road segments, one or more road segments that intersect with the path.

C: The system of paragraph A or B, the operations further comprising: receiving map data of the environment, the map data including candidate road segments; and mapping a first road segment with the first point and a second road segment with the second point, wherein the set of road segments includes the first road segment and the second road segment.

D: The system of any of paragraphs A-C, wherein the trajectory comprises data associated with the object, and the operations further comprising: determining that the first point or the second point is associated with a first candidate road segment and a second candidate road segment; comparing, as a comparison, the data with a first property associated with the first candidate road segment and with a second property associated with the second candidate road segment; and including the first candidate road segment or the second candidate road segment in the set of road segments based at least in part on the comparison.

E: The system of any of paragraphs A-D, the operations further comprising: defining a third node in the graph to represent a first road segment and a second road segment; and searching the graph comprises determining whether to include the first road segment or the second road segment in the set of road segments.

F: One or more non-transitory computer-readable media storing instructions executable by one or more processors, wherein the instructions, when executed, cause the one or more processors to perform operations comprising: receiving a trajectory associated with an object in an environment; determining a first point and a second point associated with the trajectory; searching a graph comprising a first node corresponding to the first point and a second node corresponding to the second point; determining, based at least in part on searching the graph, a set of road segments in the environment representing a path between the first point and the second point; sending the set of road segments to a vehicle computing device associated with a vehicle; and controlling the vehicle in the environment based at least in part on the set of road segments.

G: The one or more non-transitory computer-readable media of paragraph F, the operations further comprising: determining a third point of the trajectory between the first point and the second point; and defining the third point as a third node in the graph, wherein searching the graph comprises: determining a path that includes the first point, the second point, and the third point, and determining, as the set of road segments, one or more road segments that intersect with the path.

H: The one or more non-transitory computer-readable media of paragraph F or G, the operations further comprising: receiving map data of the environment, the map data including candidate road segments; and mapping a first road segment with the first point and a second road segment with the second point; wherein the set of road segments includes the first road segment and the second road segment.

I: The one or more non-transitory computer-readable media of any of paragraphs F-H, wherein the trajectory comprises data associated with the object, and the operations further comprising: determining that the first point or the second point is associated with a first candidate road segment and a second candidate road segment; comparing, as a comparison, the data with a first property associated with the first candidate road segment and with a second property associated with the second candidate road segment; and including the first candidate road segment or the second candidate road segment in the set of road segments based at least in part on the comparison.

J: The one or more non-transitory computer-readable media of any of paragraphs F-I, the operations further comprising: defining a third node in the graph to represent a first road segment and a second road segment; and searching the graph comprises determining whether to include the first road segment or the second road segment in the set of road segments.

K: The one or more non-transitory computer-readable media of any of paragraphs F-J, the operations further comprising: determining a length associated with the trajectory; identifying, based at least in part on the length, an additional point associated with the trajectory; and defining a third node in the graph to represent the additional point.

L: The one or more non-transitory computer-readable media of any of paragraphs F-K, the operations further comprising: determining that one of the first point or the second point is associated with a first candidate road segment and a second candidate road segment; comparing a first midpoint of the first candidate road segment and a second midpoint of the second candidate road segment with a third midpoint of the trajectory; and determining the first candidate road segment or the second candidate road segment to include in the set of road segments based at least in part on the first midpoint or the second midpoint being closest to the third midpoint.

M: The one or more non-transitory computer-readable media of any of paragraphs F-L, wherein the trajectory is a first trajectory, and the operations further comprising: receiving a second trajectory associated with the object; determining that a third point of the second trajectory occupies a same location as the first point of the first trajectory; comparing, as a comparison, first object state data associated with the first point of the first trajectory and second object state data associated with the third point of the second trajectory; and determining a road segment associated with one of: the first point or the third point.

N: The one or more non-transitory computer-readable media of any of paragraphs F-M, the operations further comprising: defining a first set of nodes corresponding to a first set of road segments and a second set of nodes corresponding to a second set of road segment; and searching the graph comprises selecting one of: the first set of road segments or the second set of road segments as the set of road segments representing the path.

O: The one or more non-transitory computer-readable media of paragraph N, the operations further comprising: assigning a first score to a first output of searching the first set of nodes and a second score to a second output of searching the second set of nodes, the first score or the second score indicating a level of similarity between the trajectory and road segments associated with the first output or the second output; and determining the road segments associated with the first output or the second output as the set of road segments based at least in part on the higher of the first score or the second score.

P: The one or more non-transitory computer-readable media of any of paragraphs F-O, the operations further comprising at least one of: generating the graph based at least in part on map data associated with the environment; or generating the graph to represent a region a threshold distance from the vehicle in the environment.

Q: A method comprising: receiving a trajectory associated with an object in an environment; determining a first point and a second point associated with the trajectory; searching a graph comprising a first node corresponding to the first point and a second node corresponding to the second point; determining, based at least in part on searching the graph, a set of road segments in the environment representing a path between the first point and the second point; sending the set of road segments to a vehicle computing device associated with a vehicle; and controlling the vehicle in the environment based at least in part on the set of road segments.

R: The method of paragraph Q, further comprising: determining a third point of the trajectory between the first point and the second point; and defining the third point as a third node in the graph, wherein searching the graph comprises: determining a path that includes the first point, the second point, and the third point, and determining, as the set of road segments, one or more road segments that intersect with the path.

S: The method of paragraph Q or R, further comprising: receiving map data of the environment, the map data including candidate road segments; and mapping a first road segment associated with the first point and a second road segment associated with the second point;

wherein the set of road segments includes the first road segment and the second road segment.

T: The method of any of paragraphs Q-S, wherein the trajectory comprises data associated with the object, and the method further comprising: determining that the first point or the second point is associated with a first candidate road segment and a second candidate road segment; comparing, as a comparison, the data with a first property associated with the first candidate road segment and with a second property associated with the second candidate road segment; and including the first candidate road segment or the second candidate road segment in the set of road segments based at least in part on the comparison.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. One or more non-transitory computer-readable media storing instructions executable by one or more processors, wherein the instructions, when executed, cause the one or more processors to perform operations comprising:

receiving a trajectory associated with an object in an environment;

determining a first point and a second point associated with the trajectory;

searching a graph comprising a first node corresponding to the first point and a second node corresponding to the second point;

determining, based at least in part on searching the graph, a set of road segments in the environment representing a path between the first point and the second point;

defining a first set of nodes corresponding to a first set of road segments and a second set of nodes corresponding to a second set of road segments;

searching the graph comprises selecting one of: the first set of road segments or the second set of road segments as the set of road segments representing the path;

assigning a first score to a first output of searching the first set of nodes and a second score to a second output of searching the second set of nodes, the first score or the second score indicating a level of similarity between the trajectory and one of: the first set of road segments associated with the first output or the second set of road segments associated with the second output;

determining one of: the first set of road segments associated with the first output or the second set of road segments associated with the second output as the set of road segments based at least in part on the higher of the first score or the second score;

sending the set of road segments to a vehicle computing device associated with a vehicle; and controlling the vehicle in the environment based at least in part on the set of road segments.

2. The one or more non-transitory computer-readable media of claim 1, wherein the path is a first path, and the operations further comprising:

determining a third point of the trajectory between the first point and the second point; and defining the third point as a third node in the graph, wherein searching the graph comprises:

determining a second path that includes the first point, the second point, and the third point, and determining, as the set of road segments, one or more road segments that intersect with the second path.

3. The one or more non-transitory computer-readable media of claim 1, the operations further comprising:

receiving map data of the environment, the map data including candidate road segments; and mapping a first road segment with the first point and a second road segment with the second point;

wherein the set of road segments includes the first road segment and the second road segment.

4. The one or more non-transitory computer-readable media of claim 1, wherein the trajectory comprises data associated with the object, and the operations further comprising:

determining that the first point or the second point is associated with a first candidate road segment and a second candidate road segment;

comparing, as a comparison, the data with a first property associated with the first candidate road segment and with a second property associated with the second candidate road segment; and including the first candidate road segment or the second candidate road segment in the set of road segments based at least in part on the comparison.

5. The one or more non-transitory computer-readable media of claim 1, the operations further comprising:

defining a third node in the graph to represent a first road segment and a second road segment; and searching the graph comprises determining whether to include the first road segment or the second road segment in the set of road segments.

6. The one or more non-transitory computer-readable media of claim 1, the operations further comprising:

determining a length associated with the trajectory;

identifying, based at least in part on the length, an additional point associated with the trajectory; and defining a third node in the graph to represent the additional point.

7. The one or more non-transitory computer-readable media of claim 1, the operations further comprising:

determining that one of the first point or the second point is associated with a first candidate road segment and a second candidate road segment;

comparing a first midpoint of the first candidate road segment and a second midpoint of the second candidate road segment with a third midpoint of the trajectory; and determining the first candidate road segment or the second candidate road segment to include in the set of road segments based at least in part on the first midpoint or the second midpoint being closest to the third midpoint.

8. The one or more non-transitory computer-readable media of claim 1, wherein the trajectory is a first trajectory, and the operations further comprising:

receiving a second trajectory associated with the object;

determining that a third point of the second trajectory occupies a same location as the first point of the first trajectory;

comparing, as a comparison, first object state data associated with the first point of the first trajectory and second object state data associated with the third point of the second trajectory; and determining a road segment associated with one of: the first point or the third point.

9. The one or more non-transitory computer-readable media of claim 1, the operations further comprising at least one of:

generating the graph based at least in part on map data associated with the environment; or generating the graph to represent a region a threshold distance from the vehicle in the environment.

10. A method comprising:

receiving a trajectory associated with an object in an environment;

determining a first point and a second point associated with the trajectory;

searching a graph comprising a first node corresponding to the first point and a second node corresponding to the second point;

determining, based at least in part on searching the graph, a set of road segments in the environment representing a path between the first point and the second point;

defining a first set of nodes corresponding to a first set of road segments and a second set of nodes corresponding to a second set of road segments;

searching the graph comprises selecting one of: the first set of road segments or the second set of road segments as the set of road segments representing the path;

assigning a first score to a first output of searching the first set of nodes and a second score to a second output of searching the second set of nodes, the first score or the second score indicating a level of similarity between the trajectory and one of: the first set of road segments associated with the first output or the second set of road segments associated with the second output;

determining one of: the first set of road segments associated with the first output or the second set of road segments associated with the second output as the set of road segments based at least in part on the higher of the first score or the second score;

sending the set of road segments to a vehicle computing device associated with a vehicle; and controlling the vehicle in the environment based at least in part on the set of road segments.

11. The method of claim 10, wherein the path is a first path, and further comprising:

determining a third point of the trajectory between the first point and the second point; and defining the third point as a third node in the graph, wherein searching the graph comprises:

determining a second path that includes the first point, the second point, and the third point, and determining, as the set of road segments, one or more road segments that intersect with the second path.

12. The method of claim 10, further comprising:

receiving map data of the environment, the map data including candidate road segments; and mapping a first road segment associated with the first point and a second road segment associated with the second point;

wherein the set of road segments includes the first road segment and the second road segment.

13. The method of claim 10, wherein the trajectory comprises data associated with the object, and the method further comprising:

determining that the first point or the second point is associated with a first candidate road segment and a second candidate road segment;

comparing, as a comparison, the data with a first property associated with the first candidate road segment and with a second property associated with the second candidate road segment; and including the first candidate road segment or the second candidate road segment in the set of road segments based at least in part on the comparison.

14. A system comprising:

one or more processors; and one or more non-transitory computer-readable media storing instructions executable by the one or more processors, wherein the instructions, when executed, cause the system to perform operations comprising:

receiving a trajectory associated with an object in an environment;

determining a first point and a second point associated with the trajectory;

searching a graph comprising a first node corresponding to the first point and a second node corresponding to the second point;

determining, based at least in part on searching the graph, a set of road segments in the environment representing a path between the first point and the second point;

defining a first set of nodes corresponding to a first set of road segments and a second set of nodes corresponding to a second set of road segments;

searching the graph comprises selecting one of: the first set of road segments or the second set of road segments as the set of road segments representing the path;

assigning a first score to a first output of searching the first set of nodes and a second score to a second output of searching the second set of nodes, the first score or the second score indicating a level of similarity between the trajectory and one of: the first set of road segments associated with the first output or the second set of road segments associated with the second output;

determining one of: the first set of road segments associated with the first output or the second set of road segments associated with the second output as the set of road segments based at least in part on the higher of the first score or the second score;

sending the set of road segments to a vehicle computing device associated with a vehicle; and controlling the vehicle in the environment based at least in part on the set of road segments.

15. The system of claim 14, wherein the path is a first path, and the operations further comprising:

determining a third point of the trajectory between the first point and the second point; and defining the third point as a third node in the graph, wherein searching the graph comprises:

determining a second path that includes the first point, the second point, and the third point, and determining, as the set of road segments, one or more road segments that intersect with the second path.

16. The system of claim 14, the operations further comprising:

receiving map data of the environment, the map data including candidate road segments; and mapping a first road segment with the first point and a second road segment with the second point;

wherein the set of road segments includes the first road segment and the second road segment.

17. The system of claim 14, wherein the trajectory comprises data associated with the object, and the operations further comprising:

determining that the first point or the second point is associated with a first candidate road segment and a second candidate road segment;

comparing, as a comparison, the data with a first property associated with the first candidate road segment and with a second property associated with the second candidate road segment; and including the first candidate road segment or the second candidate road segment in the set of road segments based at least in part on the comparison.

18. The system of claim 14, the operations further comprising:

defining a third node in the graph to represent a first road segment and a second road segment; and searching the graph comprises determining whether to include the first road segment or the second road segment in the set of road segments.

19. The system of claim 14, the operations further comprising:

determining a length associated with the trajectory;

identifying, based at least in part on the length, an additional point associated with the trajectory; and defining a third node in the graph to represent the additional point.

20. The system of claim 14, the operations further comprising:

determining that one of the first point or the second point is associated with a first candidate road segment and a second candidate road segment;

comparing a first midpoint of the first candidate road segment and a second midpoint of the second candidate road segment with a third midpoint of the trajectory; and determining the first candidate road segment or the second candidate road segment to include in the set of road segments based at least in part on the first midpoint or the second midpoint being closest to the third midpoint.

* * * * *